United States Patent [19]

Doriguzzi et al.

[11] 4,217,035
[45] Aug. 12, 1980

[54] LIQUID CRYSTAL DISPLAY

[75] Inventors: Rino Doriguzzi, Dottingen; Markus Egloff, Wettingen; Meinolph Kaufmann, Fislisbach; Terry J. Scheffer, Forch, all of Switzerland

[73] Assignee: BBC Brown, Boveri & Company, Limited, Baden, Switzerland

[21] Appl. No.: 805,398

[22] Filed: Jun. 10, 1977

[30] Foreign Application Priority Data

Jun. 16, 1976 [CH] Switzerland ............ 7652/76
Mar. 16, 1977 [CH] Switzerland ............ 3256/77

[51] Int. Cl.² ........................................ G02F 1/13
[52] U.S. Cl. .............................. 350/338; 350/344
[58] Field of Search .......... 350/334, 336, 338, 339, 350/349, 344

[56] References Cited

U.S. PATENT DOCUMENTS

| | | | |
|---|---|---|---|
| 3,505,804 | 4/1970 | Hofstein | 350/332 X |
| 3,613,351 | 10/1971 | Walton | 350/332 X |
| 3,837,730 | 9/1974 | Hatfield et al. | 350/349 |
| 3,881,809 | 5/1975 | Fergason et al. | 350/338 |
| 3,886,014 | 5/1975 | Bayer | 350/335 |
| 3,932,026 | 1/1976 | Sprokel | 350/339 |
| 3,991,463 | 11/1976 | Squitier et al. | 350/334 X |
| 4,012,119 | 3/1977 | Adams et al. | 350/338 |
| 4,050,786 | 9/1977 | Feldman | 350/344 |
| 4,093,357 | 6/1978 | Jacobson et al. | 350/338 |

FOREIGN PATENT DOCUMENTS

1407657 9/1975 United Kingdom ............ 350/338

OTHER PUBLICATIONS

Gladstone et al., "Liquid Crystal Display Device Configuration", *IBM Technical Disclosure Bulletin*, vol. 15, pp. 437–438, Jul. 1972.

*Primary Examiner*—Edward S. Bauer
*Attorney, Agent, or Firm*—Oblon, Fisher, Spivak, McClelland & Maier

[57] ABSTRACT

A liquid crystal display, and process of manufacture therefor, employing an integrated reflector internal to the liquid crystal cell, and consisting of a guest-host liquid crystal layer sandwiched between two cell plates and located between front and rear electrodes. At least the front electrode is composed of segments and parts of the reflector and/or rear electrode that lie opposite the conduction paths leading to these segments are at an electrical potential whose difference from the potential of the conduction paths is smaller than the threshold voltage of the liquid crystal layer used.

6 Claims, 13 Drawing Figures

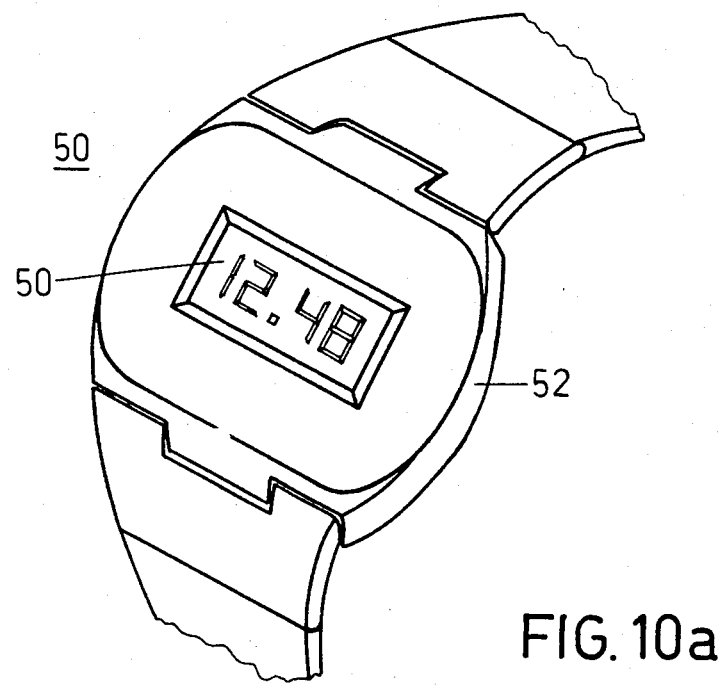
FIG. 10a
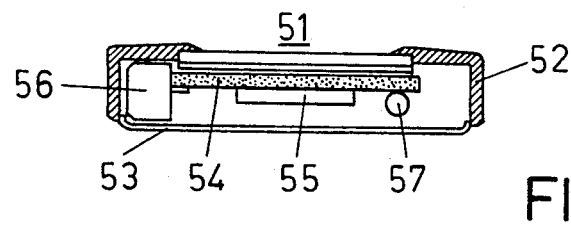
FIG. 10b
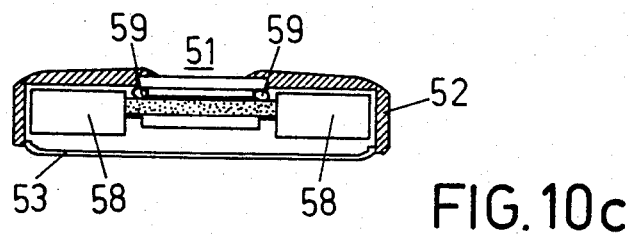
FIG. 10c
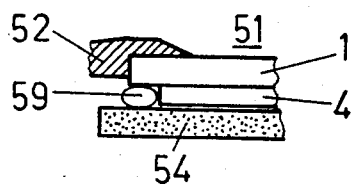
FIG.d

LIQUID CRYSTAL DISPLAY

BACKGROUND OF THE INVENTION

1. Field of the Invention

This invention relates to a liquid crystal display, its manufacture, and its subsequent application, and more particularly to a display that employs an integrated reflector that is internal to the liquid crystal cell and that consists of a guest-host liquid crystal layer sandwiched between two cell plates and located between front and rear electrodes.

2. Description of the Prior Art

The nematic liquid crystal guest-host electrooptical effect is well-known (Applied Physics Letters, vol. 13, page 91, 1968) and has already been exploited in electro-optical display devices (see DT-OS 2,410,557). Another type of liquid crystal display is shown in the Journal of Applied Physics, vol. 45, pp. 4178-4723, 1974. This display is operated in the reflection mode, employs pleochroic dyes (guest) in a cholesteric liquid crystal solvent (host), and exhibits an unusually bright appearance because it does not use external polarizers. In addition, this publication presents the basic operating principle of the cholestcric guest-host display effect (e.g. FIG. 1) and also gives useful data on suitable liquid crystal mixtures and other experimental results.

Although liquid crystal displays employing a guest-host liquid crystal layer do not require the troublesome and expensive polarizers, this kind of display has not, until now, been able to compete with the proven technology of the conventional twisted nematic display. This is because in reflective guest-host displays made by placing a reflector behind the liquid crystal cell noticeable paralax occurs and produces a double image. This effect is particularly disturbing in relatively small displays where the width of the electrode segments is comparable to the thickness of the plates used for the cell. This unfavorable relationship is primarily found in displays that are designed for wrist watches and digital voltmeters.

It would then seem sensible to integrate the reflector into the interior of the cell. Unfortunately when this is done disturbing effects appear, particularly in alpha-numeric displays. The integrated reflector, which is electrically conducting, takes over the function of a rear electrode in this case with the effect that not only the selected electrodes themselves become visible but also the conducting paths leading to these electrodes. Since these conducting paths can not for technological and electrical reasons be made arbitrarily narrow, this interfering effect hampers the practical application of this kind of display.

SUMMARY OF THE INVENTION

Accordingly, one object of this invention is to provide a new and improved liquid crystal display which is easy and inexpensive to manufacture, and which exhibits outstanding optical properties.

Another object of this invention is to provide a new and improved liquid crystal display which is free of the aforementioned drawbacks.

Another object of this invention is to create a display which has a larger viewing angle than the conventional twisted nematic display.

A further object of this invention is to create a display in which the conduction paths leading to the electrode segments do not become visible upon activating an electrode segment.

Briefly, these and other objects of the invention are achieved by producing a liquid crystal display with a reflector, wherein the reflector is made by coating the rear electrode and the rear cell plate either with a metallic coating or with white reflective particles, or by depositing metallic or white diffusely reflecting particles onto the rear cell plate.

A unique characteristic of this invention is that at least the front electrode is composed of segments and that parts of the reflector and/or rear electrode that lie opposite the conduction paths leading to these segments are at an electrical potential whose difference from the potential of the conduction paths is smaller than the threshold voltage of the liquid crystal layer used.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 10a illustrates the application of a guest-host liquid crystal cell with a digital display in an extra-flat wristwatch; and FIG. 10b-10d shows further details of the construction of the wristwatch shown in FIG. 10a.

DESCRIPTION OF THE PREFERRED EMBODIMENTS

Figure 1:
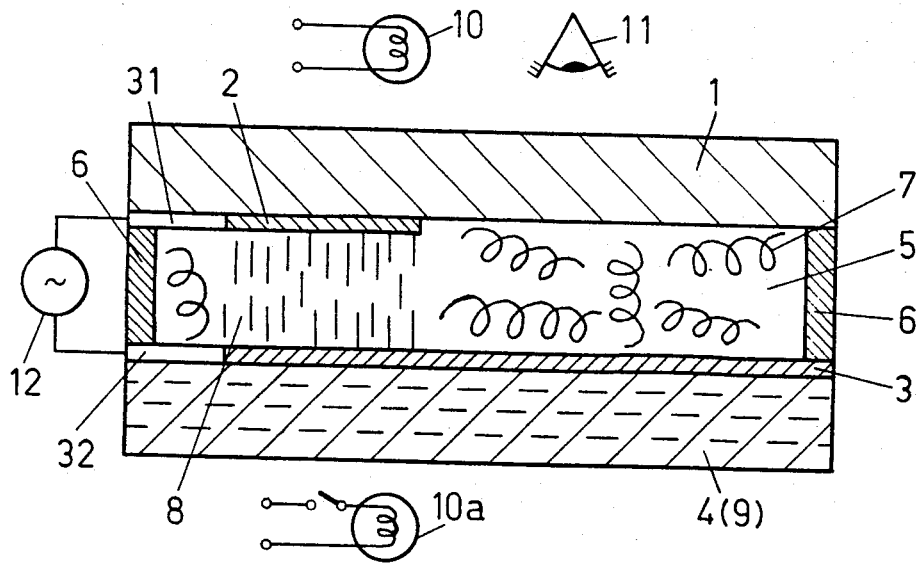
FIG. 1 is a schematic illustration of a guest-host liquid crystal display with the first type of integrated reflector that is semi-transparent and suitable for either transmissive or reflective modes of operation.

Referring now to the drawings, wherein like reference numerals designate identical or corresponding parts throughout the several views, and more particularly to FIG. 1 thereof, a guest-host liquid crystal display is illustrated which is composed of a front cell plate 1 with a front electrode 2 on its inner surface and a rear cell plate 4 with a rear electrode 3 on its inner surface. A liquid crystal layer 5 is hermetically sealed between the two plates 1, 4 by means of a spacer element 6 which runs around the boarders of the plate. The liquid crystal layer 5 has a light-absorbing, helicoidal structure 7 which can be transfromed by the application of an electric field to a uniform structure 8 which is only slightly light absorbing, if at all. Such an electric field could be generated, for example, by attaching an a.c. voltage source 12 to the conduction paths 31 and 32 which lead to the electrodes 2 and 3, respectively.

In the reflective mode of operation the liquid crystal display is illuminated from the front side, as indicated here by the illumination source 10. The display is also viewed from this side by viewer 11. Incident light falling upon the non-absorbing, uniform region 8 of the liquid crystal layer 5 is transmitted through to the rear cell plate 4 which is made from milk glass. This plate also serves as a reflector 9 which diffusely reflects this light through the transparent electrodes 3 and 2 and the transparent cell plate 1 back to the viewer 11.

When the surrounding illumination is insufficient (e.g. source 10), it is possible to operate the liquid crystal display in the transmissive mode by turning on a substitute illumination source 10a that is located behind the rear cell plate 4.

The liquid crystal layer 5 is 10 $\mu$m thick and is composed of a nematic liquid crystal mixture with positive dielectric anisotropy to which has been added an optically active substance and a pleochroic dye. An example of such a liquid crystal mixture would be a 1:1:1 by weight nematic mixture of p-butoxy-, p-hexyloxy-, and p-oxtanoyloxy-benzylidene-p-aminobenzonitrile to which has been added 5–15% of an optically active material such as cholesteryl benzoate and about 0.2–1% of a pleochroic dye such as Indophenol Blue. These type of mixtures are known from the literature (Journal of Applied Physics, vol. 45, pages 4718–4723, 1974) and can be replaced with any other mixture that has the same or similar physical properties. The technology necessary for the fabrication of the cell itself is well-known and can be found in the literature dealing with the fabrication of twisted nematic cells.

Figure 2:
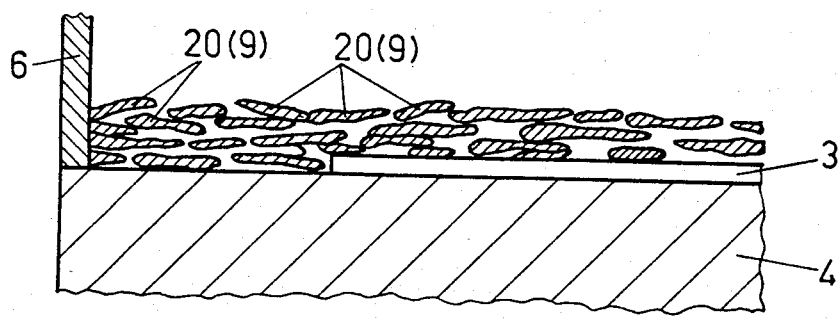
FIG. 2 shows a preferred embodiment of the second type of integrated reflector that employs metal particles.

FIG. 2 illustrates a preferred embodiment of the invention. Only those elements in this figure and in the following figures that differ from those of FIG. 1 will be specially mentioned. A rear cell plate 4 (FIG. 2) made from glass is coated with a transparent $SnO_2$ electrode 3. The rear electrode 3 and the remaining uncoated portions of the inner surface of the rear cell plate 4 are both covered with insulating aluminum particles 20. A surface coated with these metal particles 20 functions as a metallic reflector 9 and has a surface conductivity of less than 10 $\mu$s (micro-siemens or micro-mho) per unit area.

Another cell plate 4 (FIG. 3) has a textured surface structure 41 which is produced by a grinding operation with subsequent etching. A conducting layer serving as the rear electrode 3 is deposited upon this textured surface 41 and then the whole inner surface of the plate is covered with discrete reflective regions. The cell plate 4 of FIG. 4 has a roughened surface. The discrete reflective regions 21 are composed of small aluminum squares with sides about 80 $\mu$m long. The spaces between the individual squares are about 50 $\mu$m wide.

Figure 3:
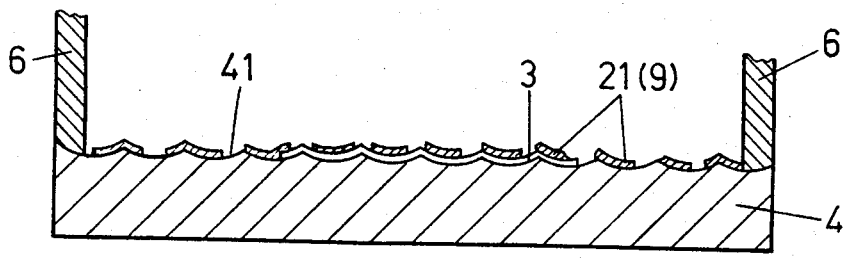
FIG. 3 shows the third type of integrated reflector which is composed of discrete reflective regions.
Figure 4:
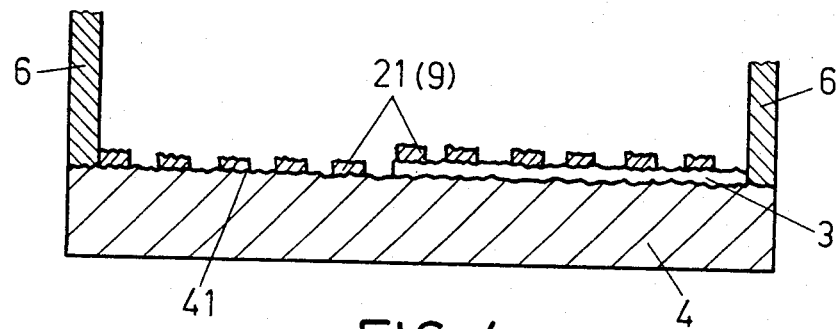
FIG. 4 shows the fourth type of integrated reflector which is composed of square reflecting regions.

The embodiments of FIGS. 3 and 4, characterized by the discrete reflective regions 21, permit the liquid crystal display to be operated in the transmissive mode by turning on a substitute illumination source 10a located behind the cell as is shown in FIG. 1. The discrete reflective regions 21 are about 0.5 $\mu$m thick, but this can be varied within wide limits in order to be compatible with the chosen technology.

Figure 5:
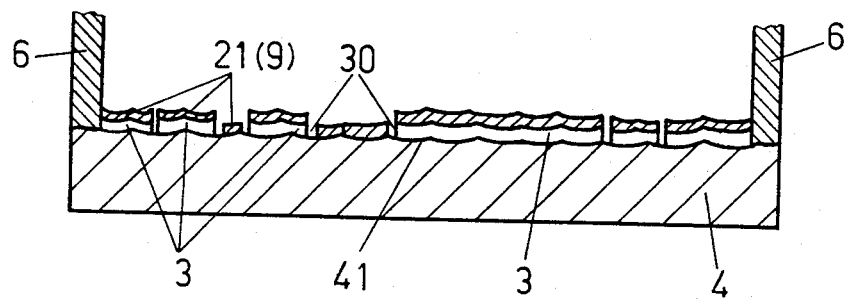
FIG. 5 shows the fifth type of integrated reflector which is composed of a metallic layer having separation lines.

A modification of the cells shown in FIGS. 3 and 4 is shown in FIG. 5. The discrete reflective regions 21 have larger areas here and are insulated from one another by the separation lines 30 which are 10 to 50 $\mu$m wide. This structure therefore transmits very little light, and for this reason the transmissive mode of operation is not feasible.

Figure 6:
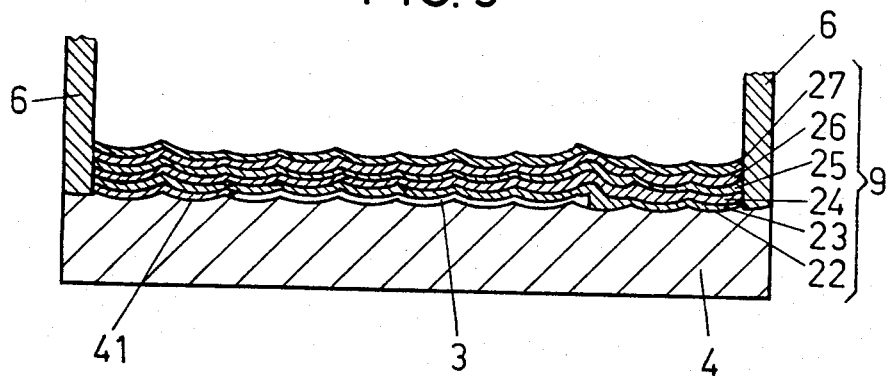
FIG. 6 shows the sixth type of integrated reflector which is composed of six dielectric layers.

As is shown in FIG. 6 the rear cell plate 4 again has a textured structure 41 upon which the rear electrode 3 is deposited. A broad-band dielectric mirror is then deposited over the entire inner surface of the cell plate. This mirror is composed of six layers of dielectric material 22–27 in which adjacent layers have differing refractive indices. The layers can also be deposited in reverse order, that is, a metal or conductive metal oxide layer which takes over the function of the rear electrode 3 is then deposited on the uppermost dielectric layer 27. The dielectric layers 22–27 composed of $SiO_2$ and $MgF_2$ could also be replaced by a single 0.1 to 1 $\mu$m thick layer of silicon. The advantage of the embodiment shown in FIG. 6 is that the uniform covering of the rear electrode 3 by the dielectric layers 22–27 protects the rear electrode 3 from electrochemical degradation.

The embodiments shown in FIGS. 2 and 6 require capacitive coupling of the driving voltage into the liquid crystal layer, which means that dc operation of the liquid crystal display is not possible. The individual metal particles of aluminum pigment 20 (FIG. 2) become covered with a 10–100 Å thick oxide layer in a normal atmosphere. This oxide coating acts as an insulator even though, as is shown in FIG. 2, the metal particles are very tightly packed together. There is practically no conductivity in the plane of the electrode surface. There is nonetheless a very good capacitive coupling in the direction normal to the cell plate because the particles lie very close together, and this makes ac operation of the display possible.

In the following sections a description of the fabrication techniques employed for the separate embodiments will be provided in order to obtain a deeper understanding of each of the variations.

In principle the proven materials such as $SnO_2$, $InO_2$, Al, Au, etc. already employed in the manufacture of twisted nematic cell are also suitable for the electrodes 2 and 3 in all the variations of this invention. The milk glass used for the rear cell plate 4 in the embodiment shown in FIG. 1 could also be replaced with a sandwich-like cell plate 4 which has a coating of white reflective particles. This type of cell plate 4 is heat-sensitive, however, and it must therefore be sealed to the front cell plate 1 with a low-temperature process using, for example, a photopolymer or a thermoplastic cement. The proven reflector materials such as aluminum, gold, silver, chromium, etc. are also suitable for the fabrication of the integrated reflector 9 shown in FIGS. 3–6. For reasons of economy, however, aluminum reflectors are generally employed in the embodiments.

The preferred embodiment of FIG. 2 can be manufactured very cheaply. A glass cell plate 4 is coated with a preferably transparent electrode formed by evaporating $SnO_2$ or $In_2O_3$. The area of the cell plate 4 that will become the viewing area of the display cell, is then printed with an aluminum-bronze paint in a subsequent silk-screening printing process. The aluminum-bronze paint is composed of a binder (e.g. a 1:1 by weight mixture of nitrocellulose and amyl acetate) and aluminum pigment particles that have an average length of 2–10 $\mu$m. The ratio by weight of binder to pigment can vary from 1:5 to 1:15. A boarder of glass frit, which seals the cell and also acts as the cell spacer 6, can then be printed on the cell plate in the next production step. The optimum thickness of the aluminum-bronze paint coating varies with the concentration of the aluminum pigment in the binder and also depends upon whether an ordinary reflector or a semi-transparent reflector is desired. In practice, a 15-20 μm thick aluminum-bronze paint layer has proven to be suitable. After putting the two cell plates 1 and 4 together and adjusting their relative positions with respect to the shape of the electrodes 2 and 3, the cell is then put into a glass-sealing oven of the same type that is employed for the glass-sealing process in twisted nematic cells. The cell plates are sealed together after about an hour at an oven temperature of about 400°–500° C. The binder is burned off during this process, leaving no residue, and the aluminum pigment packs together to form a 2-5 μm thick coating. The abrasion resistance of the aluminum-bronze paint and the aluminum pigment can be increased by adding 1 μm glass frit powder to the mixture.

Figure 7:
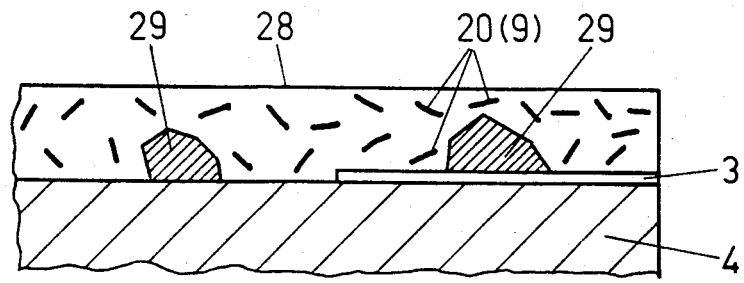
FIG. 7 is a schematic illustration of the fabrication process of the second type of integrated reflector after the silk-screening step.
Figure 8:
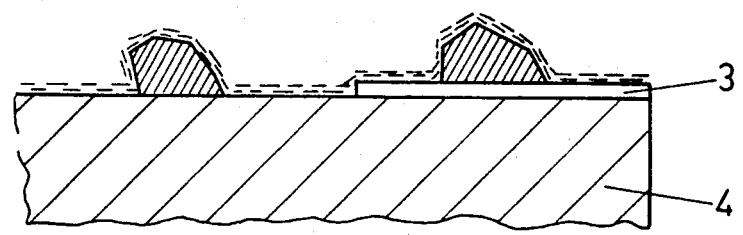
FIG. 8 is a schematic illustration of the fabrication process of the second type of integrated reflector after the glass-sealing step.

Variations representing further developments in the cell technology of FIG. 2 are illustrated in FIGS. 7 and 8. Non-conducting particles 29 are added to the aluminum-bronze paint after it has been printed onto the cell plate 4. The largest dimension of the particles is 12 μm, corresponding to the nominal separation of the two cell plates 1 and 4. These non-conducting particles 29 function as cell spacers after the glass-sealing process. This has the advantage of letting the glass frit serve its primary purpose of sealing the cell without requiring it to function as a cell spacer as well. FIG. 8 shows how the non-conducting particles 29 are surrounded by the aluminum pigment, designated here by the metal particles 20. Because these particles 29 are present in only a very low concentration, a relatively small number of particles being required for each cell, and since they are non-conducting, there is no disturbance to the optical properties of the display. Particles 29 of $CeO_2$, MgO, $SiO_2$, TiO, $TiO_2$, $ZrO_2$ or $Al_2O_3$ have proven to be suitable, The shape of the particles is not critical. Also, 20-100 μm long 10 μm diameter glass fibers have likewise proven to be suitable for this application.

The fabrication of an integrated reflector 9 as in FIG. 3 starts with a glass cell plate 4 which has a textured surface structure 41. The textured surface structure 41 is produced in a grinding and etching operation. The purpose of this type of surface treatment is to create a structure which diffusely reflects light after reflective regions 21 have been deposited on it. Such textured structures 41 are shown in FIGS. 3 and 6, and depending upon the application of the liquid crystal display, the texture can be made coarser or finer in order to produce a variety of reflection characteristics.

The rear cell plates 41, FIGS. 1-6, are provided by an evaporation process with a specially-shaped rear electrode 3 corresponding to the types of characters that will be displayed. A rear cell plate 4 prepared by this means is then covered with discrete reflective regions 21 (FIG. 3) by evaporating aluminum through an evaporation mask made by placing a monofilament screen directly against the textured structure 41. The size of the discrete reflective regions 21 conforms to the mesh aperture of the monofilament screen.

The use of masks for the selective evaporation of materials is well-known and descriptions of this technique are given, for example, in "Handbook of Thin Film Technology" McGraw-Hill Book Company, 1970, pages 7-8 and 20-13. The masks described in this book, however, are wire grill masks, whereas the masks employed in the present invention are monofilament screens of the type commonly used in silk-screen printing.

It has been found that a rear cell plate 4 that has been fabricated using the above-described evaporation process makes it possible to build display devices having an outstanding contrast, even in the transmissive mode of operation. For very thin reflective regions 21($\leq$0.1 μm) sputtering instead of evaporation has also given satisfactory results. Another possible way to produce the reflective regions consists of uniformly coating the rear cell plate 4 and its rear electrode 3 with aluminum, photolithographically depositing a screen pattern on it, and finally etching away 10-50 μm wide separation lines from it (FIG. 4).

Figure 9:
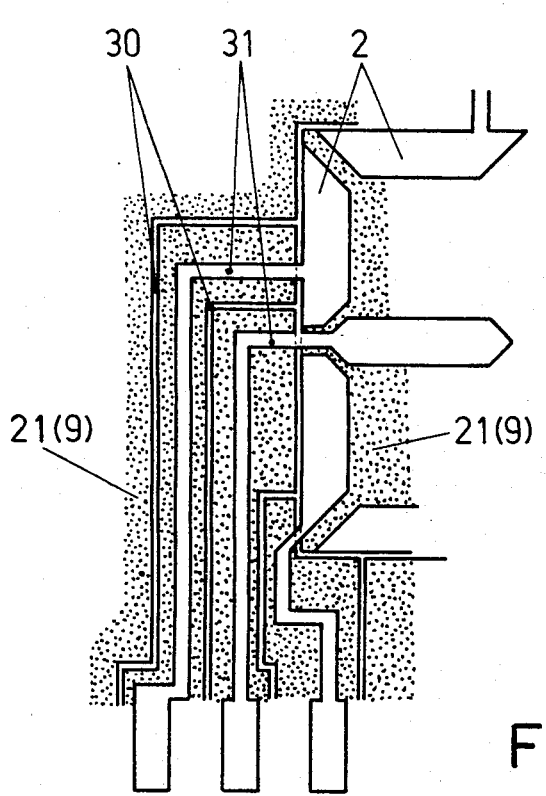
FIG. 9 shows the layout of the separation lines of the reflector shown in FIG. 5 for the case of a seven-segment digit.

The above technology is especially suited for large-area displays. The shape of the reflective regions 21 (FIG. 5) is altered to suit the pattern that is to be displayed. An example of this principle is given in FIG. 9 where a layout for the separation lines 30 is illustrated for a seven-segment digit. As is shown in FIG. 9, the pattern of the separation lines 30 is chosen so that each conduction path 31 leading to a front electrode 2 of the front cell plate 1 is completely surrounded by separation lines 30 on the rear cell plate 4. This results in independent reflective regions 21 that have low potentials with respect to the conduction paths 31 leading to the front electrodes 2. Accordingly, any reflective region that lies opposite the conduction paths leading to the front electrode segments is at an electrical potential whose difference from the potential of the conduction paths is smaller than the threshold voltage of the liquid crystal layer used in the display. In this embodiment the rear electrode 3 is an inter-connected region of $SnO_2$ which is, along with the conduction path leading to it, covered with the integrated reflector 9. Connection to the electrodes 2 and 3 is made from the faces of the cell plates 1 and 4.

The integrated reflector shown in FIG. 6 is also produced by an evaporation process. $MgF_2$ and $SiO_2$, for example, are suitable materials for the dielectric layers 22-27; about 1 μm thick layers of these materials are alternately evaporated onto the cell plate.

In all of the preceding embodiments the front electrode 2 is made by evaporating $SnO_2$ or $InO_2$ onto the front cell plate 1. The two cell plates 1, 4 are sealed together using glass frit, but a photopolymer, polymerization with subsequent hardening (see the German Pat. No. 2,322,616), or a thermoplastic cement could also be employed.

The outstanding properties of the guest-host liquid crystal displays produced using this invention are summarized in the attached table. The table shows that the guest-host liquid crystal displays of the invention could successfully replace the twisted nematic cells used presently by the watch industry. Furthermore, these guest-host liquid crystal displays make it possible to construct digital wristwatches that are considerably thinner than has previously been possible.

FIG. 10a shows that a digital wristwatch 50 outfitted with a guest-host liquid crystal display cell 51 does not require a protective watch crystal; the liquid crystal cell 51 can be built directly into the watch case 52 and is relatively insensitive to scratches since the display does not require polarizers, half-wave retardation plates, etc. By this means it is possible to build extremely flat, elegant, and priceworthy solid state watches. The higher operating voltage required for this display, as compared with the twisted nematic display, can be obtained from several conventional miniature watch batteries connected in series or from a voltage converter circuit. Construction details of the wristwatch 50 are more closely examined in the following paragraphs.

FIG. 10b gives a cross sectional view (section parallel) to the long dimension of the liquid crystal cell 51) of the liquid crystal cell 51 that is set into the watch case 52. Also shown in the figure is a circuit board 54 with an integrated circuit 55 mounted on it and a quartz oscillator crystal 56 with its trimming element 57. The watch case 52 is closed with a bottom cover 53.

FIG. 10c shows a cross section of the wristwatch 50 that is cut at right angles to the cut shown in FIG. 10b. The additional elements that are visible here are the two rubber contact gaskets 59 and the two batteries 58.

Details of the mounting and contacting of the liquid crystal cell 51 can be seen from the enlarged view shown in FIG. 10d. The front cell plate 1 of the liquid crystal cell 51 is tightly cemented into a matching hole in the watch case 52. The rear cell plate 4 of the liquid crystal cell 51 is not as wide as the front cell plate 1, resulting in two offset regions running along the sides of the cell. Rubber contact gaskets 59 are then laid in both of these offset regions. These rubber contact gaskets 59, which are commercially available, electrically connect the electrode contacts of the cell plates 1 and 4 with the corresponding terminals of the integrated circuit 55 which are brought out onto the circuit board 54.

It is clear that the mounting technique described above can just as well be applied to analog liquid crystal displays. In order not to clutter up the figure with unnecessary details, only a simple, one-function display has been illustrated and the setting buttons, etc. have been omitted. The wristwatch shown in FIG. 10a is 29 mm in diameter and less than 8 mm thick.

An integrated reflector variant that is especially suitable for application in wristwatches has a semi-transparent reflective layer composed of aluminum pigment.

According to the invention, this type of integrated, semi-transparent reflector can be fabricated either by a silk screen printing process or by a spraying technique. This kind of reflector is especially suitable for nightime illumination of the liquid crystal cell by means of an illumination source located behind the cell plate 4. In the silk-screening technique insulating metal particles 20 in the form of a viscous aluminum-bronze paint having a 3-5% by weight fraction of aluminum pigment in a binder are coated onto the cell plate 4. The degree of transmission of the reflective layer can be varied over a wide range (approximately between 5-50%) by choosing the thickness of the aluminum-bronze paint coating. It is noted that 2-12 μm long aluminum pigment particles in a 0.2-5 μm thick coating have been found to be especially suitable.

The silk-screen printing technique is especially useful for mass production methods. Screens with more than 100 threads per cm are suitable for this application. The prototypes of this invention were made using a screen with 200 threads per cm (Estalmono 200 from the Swiss Silk-Screen Factory, St. Gallen).

Another production process is the spray technique. In this process, 2-12 μm long aluminum pigment particles are mixed with a low-viscosity, non-flammable solvent such as difluorodichloromethane (Freon TF from du Pont) in a high-speed mixer or by means of an ultrasonic bath. From 1-20% by weight of the aluminum pigment is mixed with the solvent, with careful attention being given to obtain a uniform mixture without noticeable agglomeration of the pigment particles. According to this invention, such a mixture is then sprayed onto the pre-cleaned cell plates 4 using a spray gun with a very fine nozzle under a pressure of 4-6 atmospheres. The thickness of the coating is chosen to give the desired degree of reflection. Using this technique it is found that the solvent vaporizes before it hits the cell plate and that a substantially homogeneous reflector structure is achieved. In principle these reflectors could already be used in liquid crystal cells, but at this stage they are sensitive to scratching and wiping. A subsequent heat treatment at a temperature of 400°-500° C. for about two hours is therefore recommended to thermally stabilize the reflector and make the cell plate 4 substantially abrasion-proof.

The electron micrographs of FIGS. 11 and 12 were taken of a reflector produced by the silk-screen printing technique. The scale- or flake-like shapes of the aluminum pigment particles are easily seen in these pictures. The uncoated, transparent regions of the glass cell plate 4 show up as dark regions without structure.

The following table gives the performance characteristics of the guest-host liquid crystal display described in this invention as well as those of a conventional twisted nematic display having the same active area.

TABLE

| | twisted nematic display | cholesteric guest-host liquid crystal display |
|---|---|---|
| Cost | more expensive-requires polarizers and a liquid crystal orienting layer on the cell plates | considerably cheaper in spite of the extra costs for the dye |
| Operating voltage | 3 V | 6-12 V |
| Current consumption (4 digits driven at 3 V) | 0.2 μA | 0.4-1 μA |
| Total of rise and decay times | 350 m sec | <350 m sec |
| Capability for multiplexing | N ≃ 3 digits | N > 3 digits |
| Display type | "on": black <u>"off": white</u> "on": white "off": black | "on": white (i.e. bright) off": black (i.e. dark or colored) |
| Brightness | 25% | >25% for various contrast |

TABLE-continued

| twisted nematic display | | cholesteric guest-host liquid crystal display |
|---|---|---|
| | | ratios |
| Contrast ratio | 12 : 1 | >12 : 1 |
| Angle dependence | adequate | very good |

LIST OF REFERENCE NUMERALS AND CORRESPONDING ELEMENTS FOR ALL FIGURES

1=front cell plate
2=front electrode
3=rear electrode
4=rear cell plate
5=liquid crystal layer
6=spacer
7=light-absorbing helicoidal structure
8=non-absorbing uniform structure
9=reflector
10=illumination source
10a=switchable, substitute light source
11=observer
12=ac voltage source
20=insulating metal particles
21=discrete reflective regions
22=dielectric layer
23=dielectric layer
24=dielectric layer
25=dielectric layer
26=dielectric layer
27=dielectric layer
28=binder
29=non-conductive spacer particles
30=separation lines
31=conduction path to electrode 2
32=conduction path to electrode 3
41=textured surface structure
42=roughened surface
50=digital wristwatch
51=guest-host liquid crystal cell
52=watch case
53=bottom cover to watch case
54=circuit board
55=integrated circuit
56=quartz oscillator crystal
57=frequency trimming element
58=battery
59=rubber contact gasket
20a, b, c, d=aluminum pigment particles
AR=viewing direction of the electron microscope Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a liquid crystal display including a guest-host liquid crystal layer located between front and rear electrodes of front and rear cell plates, and an integrated reflector located between the front and rear cell plates, the improvement comprising:
   at least said front electrode composed of segments and conduction paths leading thereto, and
   said reflector comprising mutually insulating metal particles, each having an insulating oxide coating, deposited on the inner surface of the rear cell plate and the rear electrode, said insulated metal particles forming said reflector having a surface conductivity of at most 10 uS (micro Siemens) per square in the plane of the electrode surface.

2. A liquid crystal display as recited in claim 1, wherein:
   said insulating metal particles are aluminum pigment particles which are deposited in a coating that is from 0.2 to 50 $\mu$m thick.

3. A liquid crystal display as recited in claim 2, further comprising:
   a reflector which transmits at least a portion of any light impinging thereon, wherein said inuslating metal particles are from 2 to 12 $\mu$m long aluminum pigment particles which are deposited in a coating that is from 0.2 to 5 $\mu$m thick.

4. A liquid crystal display as recited in claim 1 wherein:
   from 1 to 5% glass frit powder having a particle size of from 0.1 to 5 $\mu$m is mixed with the insulating metal particles.

5. A liquid crystal display as recited in claim 1 wherein:
   non-conducting particles from the group consisting of $CeO_2$, $MgO$, $SiO_2$, $SiO$, $TiO$, $TiO_2$, $ZrO_2$, $Al_2O_3$, are mixed with the insulating metal particles; and,
   the largest dimension of said non-conducting particles corresponds to at least approximately the nominal cell spacing.

6. A liquid crystal display as recited in claim 1 wherein:
   20 to 100 $\mu$m long glass fibers whose diameters correspond to the nominal spacing of the cell plates are mixed with the insulating metal particles.

* * * * *